United States Patent [19]
Miller

[11] 3,955,177
[45] May 4, 1976

[54] MAGNITUDE COMPARISON CIRCUIT
[75] Inventor: Homer W. Miller, Peoria, Ariz.
[73] Assignee: Honeywell Information Systems Inc., Phoenix, Ariz.
[22] Filed: Mar. 26, 1975
[21] Appl. No.: 562,318

[52] U.S. Cl.............................. 340/146.2; 235/177
[51] Int. Cl.² ......................................... G06F 7/02
[58] Field of Search...................... 340/146.2, 172.5; 235/177

[56] References Cited
UNITED STATES PATENTS

| | | | |
|---|---|---|---|
| 3,218,609 | 11/1965 | Shaw................................ | 340/146.2 |
| 3,363,233 | 1/1968 | Petzold............................ | 340/146.2 |
| 3,660,823 | 5/1972 | Recks............................... | 340/146.2 |
| 3,676,849 | 7/1972 | Malandro et al................ | 340/146.2 |

Primary Examiner—Malcolm A. Morrison
Assistant Examiner—Errol A. Krass
Attorney, Agent, or Firm—Walter W. Nielsen

[57] ABSTRACT

A magnitude comparison circuit compares two X-bit binary numbers and two Y-bit binary numbers when a mode control signal is in a first condition and generates outputs indicating the relative magnitudes of the X-bit binary numbers and the Y-bit binary numbers. The magnitude comparison circuit compares two Z-bit binary numbers when the mode control signal is in a second condition and generates an output indicating the relative magnitude of the Z-bit binary numbers, where Z equals the sum of X and Y.

3 Claims, 6 Drawing Figures

MAGNITUDE COMPARISON CIRCUIT

BACKGROUND OF THE INVENTION

This invention relates generally to a digital logic circuit and, in particular, to a magnitude comparison circuit for indicating alternatively the relative magnitudes of two pairs of binary numbers or a single pair of binary numbers.

In the digital computer art and in other arts where digital numbers are processed, compared, and otherwise manipulated, it is often necessary to compare one binary number with another and to indicate whether one of the numbers is greater than, equal to, or less than the other number. For example, it is common in programs for controlling the operation of digital computers to provide loops or conditional branches whose execution depends upon the outcome of a comparison of the relative magnitudes of two numbers. Therefore, appropriate circuitry must be provided in the processor of the data processing system for comparing two binary numbers and indicating whether one is greater than, equal to, or less than the other.

Digital comparison circuits are known in the prior art for comparing two binary numbers each comprising one or more bits. *Integrated Electronics: Analog and Digital Circuits and Systems*, Millman & Halkias, McGraw-Hill Book Company, New York, 1972, p. 605 et seq. describes such a digital comparator. The prior art magnitude comparison circuit does not make effective use of its full binary number comparison capacity since it is designed for comparing two and only two binary numbers at any given time. In order to provide in a processor utilizing the prior art magnitude comparison circuit binary numbers it is necessary to provide redundant magnitude comparison circuits. The capability of simultaneous comparison of of two pairs of binary numbers is desirable from the standpoint of increasing the processing speed; however, the provision of redundant magnitude comparison circuits which may not always be fully utilized increases the cost and size of the processing hardware.

SUMMARY OF THE INVENTION

It is, therefore, an object of the present invention to provide an improved magnitude comparison circuit.

It is also an object of the present invention to provide a magnitude comparison circuit which is capable of comparing two pairs of binary numbers simultaneously and indicating the relative magnitudes of the numbers within each such pair.

It is a further object of the present invention to provide a magnitude comparison circuit having a first mode of operation according to which a first pair of X-bit binary numbers and a second pair of Y-bit binary numbers are compared and a second mode of operation according to which a single pair of Z-bit binary numbers is compared, Z being equal to the sum of X and Y.

These and other objects are achieved in accordance with a preferred embodiment of the invention by providing a plurality of 1-bit magnitude comparators each capable of indicating the relative magnitudes of corresponding bits in the same bit position of two binary numbers under comparison. In a preferred embodiment, Z of such 1-bit magnitude comparators are provided. X of these 1-bit comparators are dedicated to the comparison of two X-bit binary numbers when a mode control signal from the processor, to which the magnitude comparison circuit is responsive, is in a first condition, and they are dedicated to the comparison of the X loworder bits of two Z-bit binary numbers when the mode control signal is in a second condition, Z being equal to the sum of X and Y. Y of such 1-bit magnitude comparators are dedicated to the comparison of two Y-bit binary numbers when the mode control signal is in the first condition, and they are dedicated to the comparison of the Y high-order bits of two Z-bit binary numbers when the mode control signal is in the second condition.

The outputs of the X 1-bit magnitude comparators are combined in a first combinatorial logic network which generates an output indicating whether one of the two X-bit binary numbers is greater than, equal to, or less than the other such number when the mode control signal is in the first condition, and generates an output indicating whether the X low-order bits of one Z-bit binary number are greater than, equal to, or less than the corresponding bits of a second Z-bit binary number when the mode signal is in the second condition. Likewise, the outputs of the Y 1-bit magnitude comparators are combined in a second combinatorial logic network which generates an output indicating whether a first Y-bit binary number is greater than, equal to, or less than the other Y-bit binary number when the mode control signal is in the first condition, and generates an output indicating whether one of the two Z-bit binary numbers is greater than, equal to, or less than the other such Z-bit binary number when the mode control signal is in the second condition.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1A:
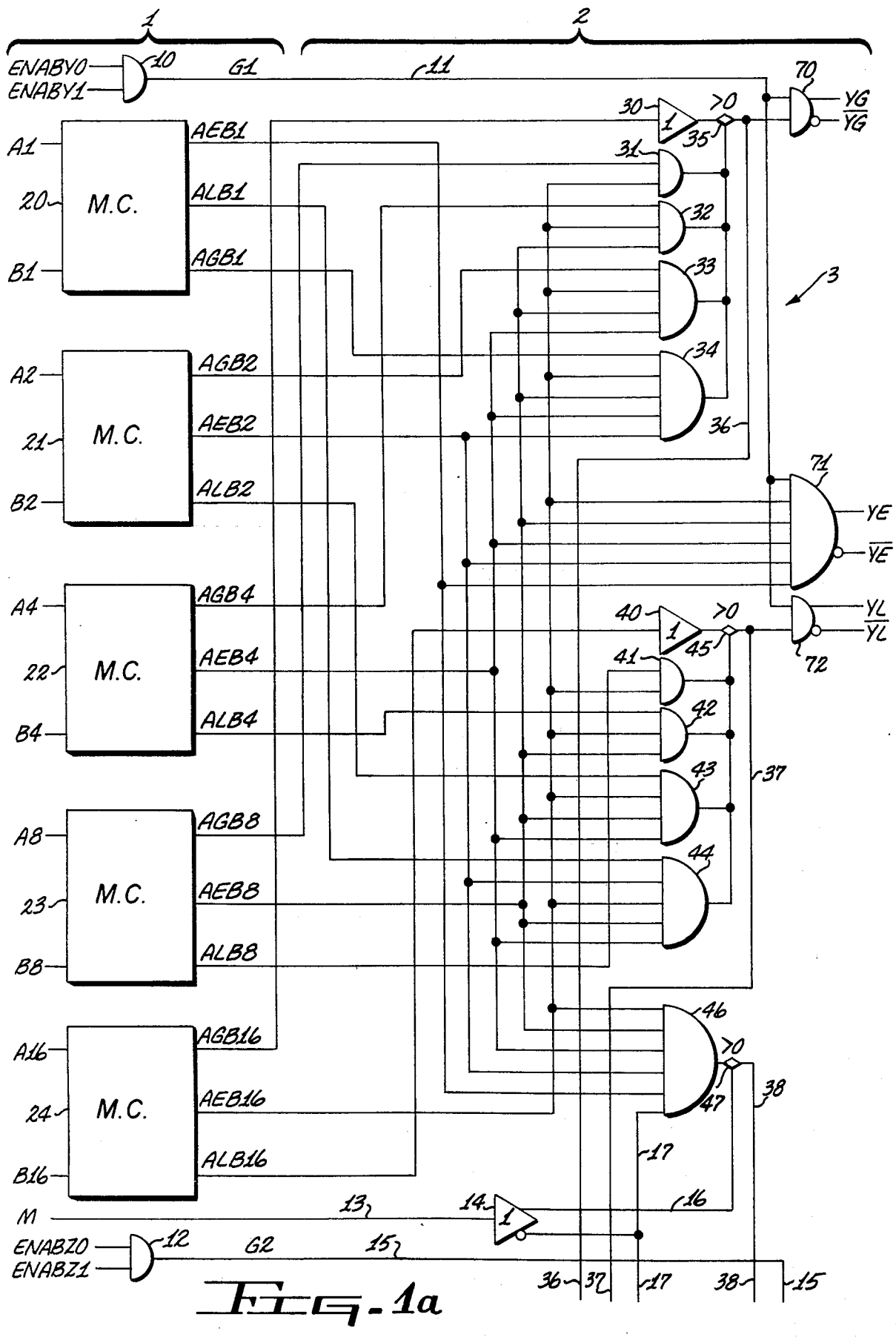
FIGS. 1a and 1b comprise a detailed block diagram circuit schematic showing the magnitude comparison circuit of the present invention.
Figure 1B:
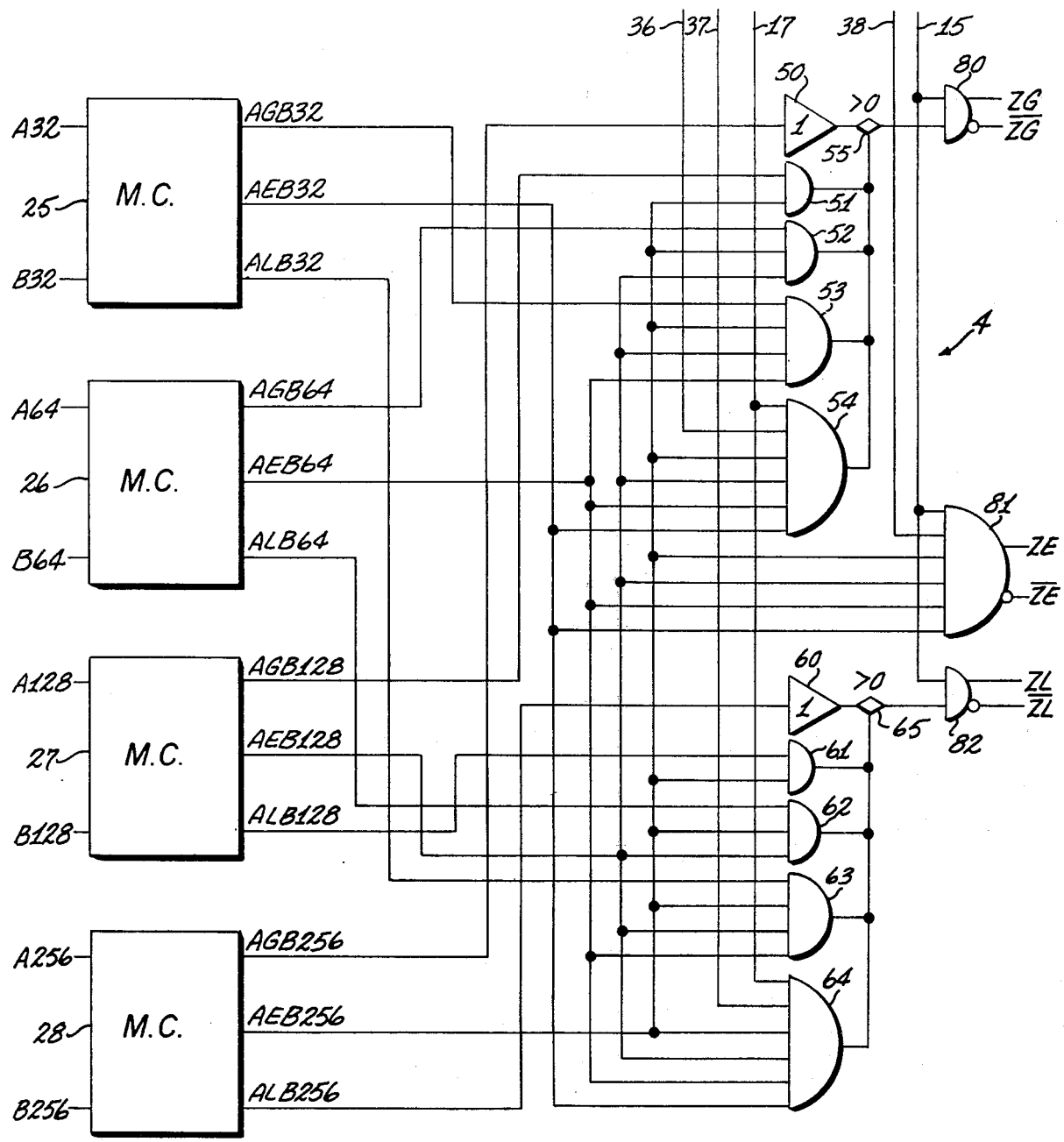

Referring now to FIGS. 1a and 1b, a detailed block diagram circuit schematic of the magnitude comparison circuit is shown. Reference numeral 1 in FIG. 1a indicates generally the plurality of 1-bit magnitude comparators 20–28, and reference number 2 indicates generally the combinatorial logic networks 3 and 4 of the present invention.

Each of magnitude comparators 20–24 has two inputs, representing corresponding bits from two binary numbers or portions thereof under comparison by the magnitude comparison circuit. Magnitude comparator 20, for example, has inputs A1 and B1 representative of the lowest order bit position of each binary number to be compared. Magnitude comparator 20 has three possible outputs indicating, respectively, whether bit A1 is greater than, equal to, or less than bit B1, and the remaining magnitude comparators 21-28 also have three such outputs for indicating the relative magnitude of their two input bits.

Magnitude comparators 20-24 are provided for comparing the X bits of two X-bit binary numbers when the mode control signal M on line 13 is in a first condition, i.e. when M is a binary 1, and magnitude comparators 20-24 compare the X low-order bits of two Z-bit binary numbers when the mode control signal M over line 13 is in a second condition represented by a binary 0. In similar fashion, magnitude comparators 25-28 compare two Y-bit binary numbers when the mode control signal M is in the first condition, and they compare the Y high-order bits of two Z-bit binary numbers when the mode control signal M is in the second condition. In a preferred embodiment X equals 5, Y equals 4, and Z accordingly equals 9; however, it will be apparent to one skilled in the art that various alternative embodiments utilizing different values of X, Y, and Z may be constructed according to the particular functions required of the magnitude comparison circuit.

As seen in FIG. 1a, the three output lines of each of the magnitude comparators 20-24 are interconnected by a first combinatorial logic network 3 comprising buffer 30, AND-gates 31-34, buffer 40, AND-gates 41-46, and AND-gates 70-72. Similarly, the three outputs of each of the magnitude comparators 25-28 are interconnected in a second combinatorial logic network 4, shown in FIG. 1b, comprising buffer 50, AND-gates 51-54, buffer 60, AND-gates 61-64, and AND-gates 80-82. The operation of the first combinatorial logic network 3 is enabled only by the presence of a signal G1 over line 11 from AND-gate 10 to AND-gates 70-72. Correspondingly, the operation of the second combinatorial logic network 4 is enabled only by the presence of a signal G2 over line 15 from AND-gate 12 to AND-gates 80-82. Signal M over line 13 to inverting/non-inverting amplifier 14 determines the particular mode of operation of the magnitude comparison circuit. When M=1, the magnitude comparison circuit makes concurrent comparisons on a pair of 5-bit numbers and a pair of 4-bit numbers, and when mode signal M=0, the magnitude comparison circuit makes a single comparison of two 9-bit numbers.

When the magnitude comparison circuit is operated in the first mode, i.e. concurrently comparing two 5-bit numbers and two 4-bit numbers, the A1, A2, A4, A8, and A16 inputs to magnitude comparators 20-24, respectively, represent the low-to-high order bits of the first 5-bit binary number, and the B1, B2, B4, B8, and B16 inputs to magnitude comparators 20-24 represent the low-to-high order bits of the second 5-bit binary number. Also, when in the first mode of operation, the A32, A64, A128, and A256 inputs to magnitude comparators 25-28 represent the low-to-high order bits of the first 4-bit binary number, and the B32, B64, B128 and B256 inputs represent the low-to-high order bits of the second 4-bit binary number.

When the magnitude comparison circuit is operated in the second mode, i.e. when a single pair of 9-bit binary numbers is being compared, the A1-A16 inputs to magnitude comparators 20-24 represent the low-order bits of the first 9-bit binary number, and the B1-B16 inputs represent the low-order bits of the second 9-bit binary number. Also, in the second mode of operation, the A32-A256 inputs to magnitude comparators 25-28 represent the high-order bits of the first 9-bit binary number, and the B32-B256 inputs represent the high-order bits of the second 9-bit binary number.

Figure 2:
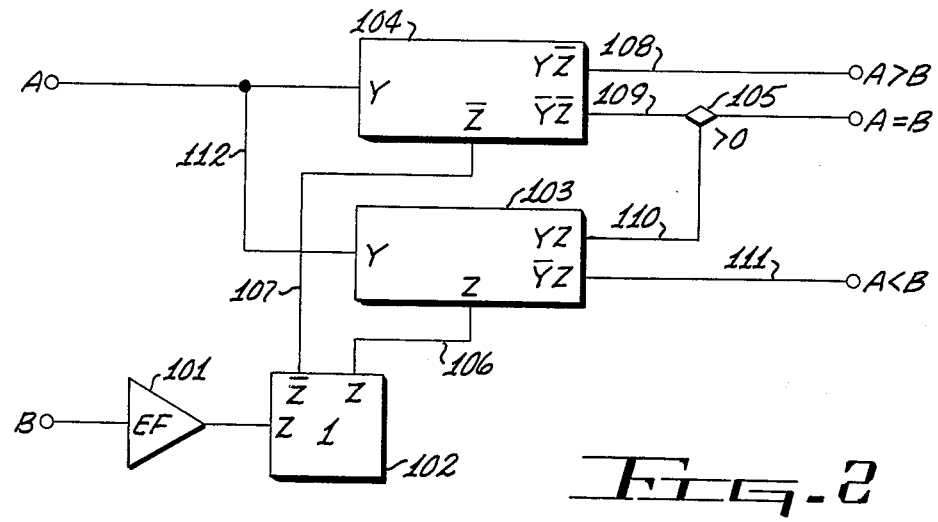
FIG. 2 shows a block diagram of one of the 1-bit magnitude comparators of the invention shown in FIGS. 1a and 1b.

In FIGS. 1a and 1b, the diamond-shaped symbols at the junctions 35, 45, 46, 55, and 65 merely represent the logic function of inclusive OR at such junctions, as is also the case with junction 105 in FIG. 2, and such symbols do not necessarily represent additional logic circuitry.

The operation of the magnitude comparison circuit will be described with reference to the hereinbelow set forth STATE TABLE after first defining the symbols appearing in the STATE TABLE.

Definitions:

Let
  AL0 equal the number A16 A8 A4 A2 A1,
  BL0 equal the number B16 B8 B4 B2 B1,
  AHI equal the number A256 A128 A64 A32, and
  BHI equal the number B256 B128 B64 B32

Logic Equations:
$G1 = ENABY0 \cdot ENABY1$
$YL = G1 \cdot (AL0 < BL0)$
$YE = G1 \cdot (AL0 = BL0)$
$YG = G1 \cdot (AL0 > BL0)$
$G2 = ENABZ0 \cdot ENABZ1$
$ZL = G2 \cdot (AHI < BHI) + G2 \cdot \overline{M} \cdot (AHI = BHI) \cdot (AL0 < BL0)$
$ZE = G2 \cdot M \cdot (AHI = BHI) + G2 \cdot \overline{M} \cdot (AHI = BHI) \cdot (AL0 = BL0)$
$ZG = G2 \cdot (AHI > BHI) + G2 \cdot \overline{M} \cdot (AHI = BHI) \cdot (AL0 > BL0)$

STATE TABLE:

| G1 | G2 | M | AL0:BL0 | AHI:BHI | YL | YE | YG | ZL | ZE | ZG |
|----|----|----|---------|---------|----|----|----|----|----|----|
| 0  | —* | — | —       | —       | 0  | 0  | 0  |    |    |    |
| 1  | —  | — | <       | —       | 1  | 0  | 0  |    |    |    |
| 1  | —  | — | =       | —       | 0  | 1  | 0  |    |    |    |
| 1  | —  | — | >       | —       | 0  | 0  | 1  |    |    |    |
| —  | 0  | — | —       | —       |    |    |    | 0  | 0  | 0  |
| —  | 1  | — | —       | <       |    |    |    | 1  | 0  | 0  |
| —  | 1  | 0 | <       | =       |    |    |    | 1  | 0  | 0  |
| —  | 1  | 1 | —       | =       |    |    |    | 0  | 1  | 0  |
| —  | 1  | 0 | =       | =       |    |    |    | 0  | 1  | 0  |
| —  | 1  | — | —       | >       |    |    |    | 0  | 0  | 1  |
| —  | 1  | 0 | >       | =       |    |    |    | 0  | 0  | 1  |

*The "Don't Care" condition is represented by "—".

The outputs YL, YE, YG, ZL, ZE, and ZG represent the magnitude of a binary number containing the A-designated bits relative to a binary number containing the B-designated bits. Consider now an example in the first mode of operation. Let us examine the case where AL0 is less than BL0, and more specifically where AL0=01111 and BL0=11111. For a comparison in this mode to take place G1 must be a binary 1 so that the output AND-gates 70–72 are enabled. Regarding magnitude comparator 20, the output will be a 1 over the AEB1 line and a 0 over the other lines. The 1 output over the AEB1 line is transmitted to output AND-gate 71 and also to AND-gate 46, with which we are not concerned in this mode of operation. Likewise magnitude comparators 21–23 generate binary 1 outputs over lines AEB2, AEB4, and AEB8, respectively, each of which is also transmitted to output AND-gate 71. Regarding magnitude comparator 24 however, since A16=0 and B16=1, the output will be a binary 1 over the ALB16 output line, and the AEB16 will be a binary 0. The presence of a binary 0 at the input to AND-gate 71 prevents the enabling of AND-gate 71, and the output of such gate is accordingly a binary 0. The binary 1 appearing on the ALB16 line of magnitude comparator 24 is transmitted through buffer 40, through the junction 45 to output AND-gate 72 which is enabled by signal G1=1, and the output over line YL of AND-gate 72 is a binary 1, indicating that AL0 is less than BL0.

The operation in the first mode where a 4-bit number is being compared will be considered for the case where AHI is greater than BHI, and specifically where AHI=0001 and BHI=0000. The G2 signal over line 15 must be a binary 1 for the comparison of the 4-bit numbers to take place. The output of magnitude comparator 25 will be a binary 1 over the AGB32 line and a binary 0 over the other two lines. The outputs of each of the magnitude comparators 26–28 will be a binary 1 over the output lines AEB64, AEB128, and AEB256, respectively. As a result AND-gate 53 has a binary 1 presented at each of its inputs and accordingly generates a binary 1 output through junction 55 to output AND-gate 80 which is enabled by signal G2. AND-gate 80 accordingly generates a binary 1 over line ZG indicating that AHI is greater than BHI.

The comparison of a pair of 9-bit numbers will now be explained, as for example in the case where the AL0 portion of the first 9-bit binary number is 00001, and the AHI portion of the first 9-bit binary number is 1111. The first 9-bit binary number appears as 111100001 when the AHI and the AL0 portions are combined. Assume that the BL0 portion of the second 9-bit binary number is 00000 and the BHI portion of the second 9-bit binary number is 1111, giving a second 9-bit binary number of 111100000. The G2 enable signal must be a binary 1 in the second mode of operation in order to enable outputs from AND-gates 80–82. Given these two 9-bit numbers, magnitude comparator 20 generates a binary 1 over output line AGB1, which is transmitted to AND-gate 34. AND-gate 34 is enabled by the binary 1 transmitted by the AEB2, AEB4, AEB8, and AEB16 outputs of magnitude comparators 21–24, respectively, to generate a binary 1 through junction 35 over line 36 to AND-gate 54. The outputs over the AEB32, AEB64, AEB128, and AEB256 lines from magnitude comparators 25–28 are all binary 1's, and such appear as additional output through AND-gate 54. Since the magnitude comparison circuit is now operating in the second mode of operation, mode signal M on line 13 is a binary 0, and the inverting output of amplifier 14 is a binary 1 over line 17. Such binary 1 appears as an additional input to AND-gate 54 enabling same to transmit a binary 1 through junction 55 to output AND-gate 80, which is enabled by the G2 enable signal. AND-gate 80 generates a binary 1 over its ZG line, indicating that the first, or A-designated, 9-bit binary number is greater than the second, B-designated 9-bit binary number.

A detailed description of the circuit building blocks of the present invention will now be provided with reference to FIGS. 2–5. FIG. 2 represents a block diagram of the logic function performed by a representational one of the magnitude comparators 20–28. Such magnitude comparator has two imputs, A and B, and three outputs indicating, respectively, whether A is greater than, equal to, or less than B. Each magnitude comparator circuit comprises an emitter follower 101, an inverter 102, and logic circuits 103 and 104. The inverter 102 accepts a given signal level Z and generates the inversion $\overline{Z}$ over line 107. Inverter 102 also generates a non-inverted output Z over line 106. Logic circuit 103 accepts inputs Y over line 112 and Z over line 106 and generates the logic function YZ over line 110 and $\overline{YZ}$ over line 111. Logic circuit 104 performs the same function as logic circuit 103; however, because a $\overline{Z}$ is input rather than a Z, it generates outputs $\overline{YZ}$ and $\overline{YZ}$ over lines 108 and 109 respectively.

The operation of the magnitude comparator shown in FIG. 2 will now be explained. When input signals A=1 and B=1, the output over line 108 of logic circuit 104 will be a logical 0, since such output is a logical 1 if and only if A=1 and B=0. The output over line 109 from logic circuit 104 will be a logical 0, since such output is a logical 1 if and only if both A=0 and B=0. The output over line 111 from logic circuit 103 will also be a logical 0, since such output is a logical 1 if and only if A=0 and B=1. The output over line 110 from logic circuit 103 will be a logical 1, since both A=1 and B=1.

In the case where A=1 and B=0, only the output line 108 from logic unit 104 will transmit a logical 1. When A=0 and B=1, only output line 111 from logic unit 103 will transmit a logical 1. Finally, when both A=0 and B=0, only the output line 109 from logic unit 103 will transmit a logical 1.

Figure 3:
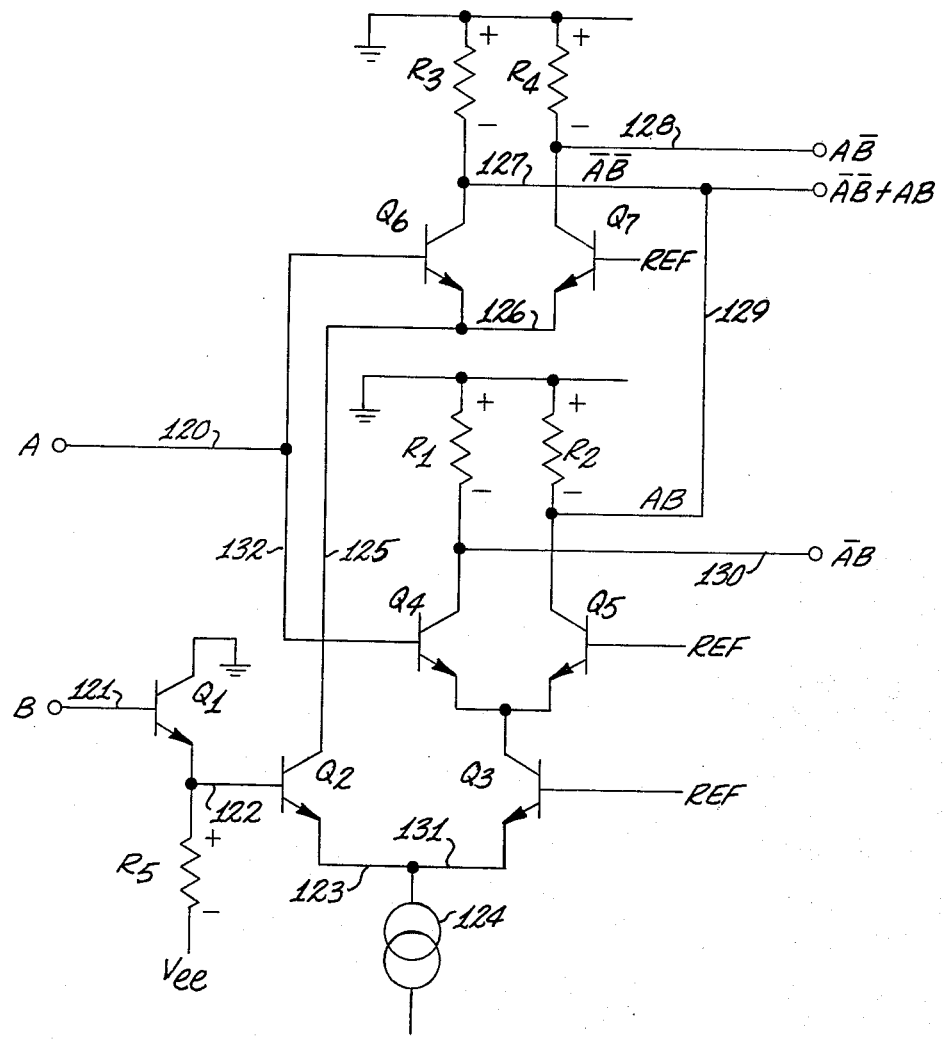
FIG. 3 shows a detailed circuit diagram of the 1-bit magnitude comparator shown in FIG. 2.

FIG. 3 represents a detailed circuit schematic of the magnitude comparator illustrated in FIG. 2. The magnitude comparator circuit of FIG. 3 comprises N-P-N transistors $Q_1 - Q_7$ operated in a soft-saturating current mode. $V_{ee}$ is typically −3.3V, and $V_{Ref}$ is approximately −.26V. A negative logic convention is employed, according to which a logical 0 is represented by a voltage of 0.0V, and a logical 1 is represented by −0.5V. When both the A and B inputs are binary 0's the voltage transmitted over lines 120 and 121 is 0.0V. As a consequence, transistor $Q_1$ is turned on as a result of the base-to-emitter potential across transistor $Q_1$, allowing current to flow from ground across the collector-emitter junction of transistor $Q_1$ and across resistor $R_5$ to $V_{ee}$. Because of the current flow from ground to $V_{ee}$, the voltage on the base of transistor $Q_2$ rises towards zero, rendering transistor $Q_2$ conductive. In similar fashion the 0.0 V signal over line 120 to the base of transistor $Q_6$ makes transistor $Q_6$ conductive, thereby forming a conductive path between current source 124 over line segment 123 through the emitter-collector junction of $Q_2$, over line 125 through the emitter-collector junction of transistor $Q_6$, causing a −0.5V representing a logical 1 output to be present on line 127.

When the A input signal applied to line 120 is binary 0 and signal B is a binary 1, transistor $Q_1$ is turned off, since the —0.5V appearing on line 121 decreases the potential across the base-to-emitter junction of transistor $Q_1$. Transistor $Q_2$ is consequently turned off, because of the decreased potential difference across the base-to-emitter junction of this transistor. Transistor $Q_3$ is rendered conductive because of the increased potential across the emitter-to-base junction of transistor $Q_3$. Transistor $Q_4$ is conductive because of the 0.0V appearing on line segment 132 to the base of transistor $Q_4$. Thus a current path is formed from ground across resistor $R_1$, across the collector-emitter junctions of transistors $Q_4$ and $Q_3$, over line segment 131 to current source 124, resulting in a —0.5V on line 130 representing a logical 1, which is the proper output for the condition when A=0 and B=1.

When the signal inputs over lines 120 and 121 are reversed, i.e. signal A=1 and B=0, transistors $Q_1$ and $Q_2$ are conductive, transistor $Q_6$ is non-conductive and transistor $Q_7$ is conductive, affording a current path from ground through resistor $R_4$ across the collector-emitter junctions of transistor $Q_7$ and $Q_2$ over line segment 123 to current source 124, thereby providing a —0.5V over line 128, which is the proper output for the given input condition.

When both inputs A and B are binary 1's, transistors $Q_3$ and $Q_5$ are conductive, providing a current path from ground through resistor $R_3$ over line 127, over line segment 129, across the collector-emitter junction of transistors $Q_5$ and $Q_3$, over line segment 131 to current source 124, thereby providing a —0.5V over line 127 representative of the condition A=1 and B=1.

Figure 4:
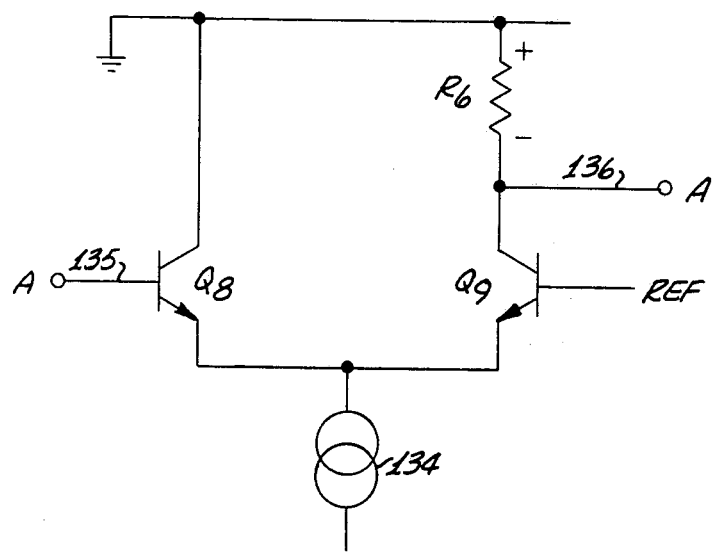
FIG. 4 shows a detailed circuit schematic of a signal buffer of the invention shown in FIGS. 1a and 1b.

FIG. 4 represents a detailed circuit diagram of a representational one of buffers 30, 40, 50, or 60 (FIGS. 1a–1b). The buffer circuit functions in such a manner as to provide the same logic level on output line 136 as appears on input line 135. For example, when the input signal A is a logical 0, transistor $Q_8$ is turned on, transistor $Q_9$ is shut off, and an output of approximately 0.0V appears on output line 136 representing a logical 0 output. When input signal A is a logical 1, transistor $Q_8$ is turned off, transistor $Q_9$ is rendered conductive, and accordingly a —0.5V signal appears over output line 136 representing a logical 1 output.

Figure 5:
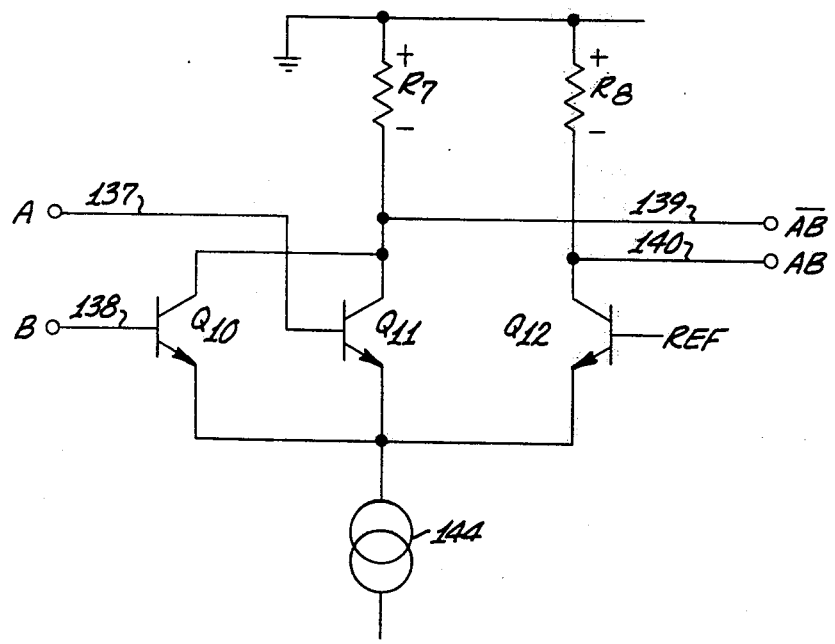
FIG. 5 shows a detailed circuit schematic of an AND-gate of the invention shown in FIGS. 1a and 1b.

FIG. 5 illustrates a detailed circuit schematic of a representational one of the AND-gates of FIGS. 1a and 1b. The circuit of FIG. 5 provides a logical 1 output over line 140 if and only if logical 1 inputs are present on both lines 137 and 138, since the presence of logical 1 inputs on lines 137 and 138 renders transistors $Q_{11}$ and $Q_{10}$, respectively, non-conductive, and renders transistor $Q_{12}$ conductive, thereby providing a —0.5V output over line 140 representing the logical condition $\overline{AB}$. At the same time, the output over line 139 is approximately 0.0V representing the logic condition $\overline{AB}$. When either or both of the input signals A and B are at a 0 logic level, one or both of the transistors $Q_{10}$ or $Q_{11}$ is rendered conductive, affording a current path from ground across resistor $R_7$ according to the indicated polarity, across the collector-emitter junction of the conductive transistor to current source 144, thereby providing a —0.5V signal on line 139 indicating a logical 1 representative of the condition AB. Given such input logic levels, transistor $Q_{12}$ is turned off, and 0.0V appears on line 140 indicating the absence of the logic condition AB.

It will be apparent to those skilled in the art that the disclosed Magnitude Comparison Circuit may be modified in numerous ways and may assume many embodiments other than the preferred form specifically set out and described above. For example, in order to perform comparisons of binary numbers of fewer bits than the 4, 5, or 9-bit capacity of the magnitude comparison circuit of the present invention, those unused inputs of the same order must be set to the identical state, either a 0 or a 1, in order for an accurate magnitude comparison to take place. It will further be apparent that when binary numbers of greater than 9 bits must be compared, an appropriate number of magnitude comparison circuits of the type disclosed by the present invention may be connected either in serial or in parallel, depending upon the required operational speed. Accordingly, it is intended by the appended claims to cover all modifications of the invention which fall within the true spirit and scope of the invention.

What is claimed is:

1. A magnitude comparison circuit for comparing two binary numbers of Z bits when a mode signal to which said magnitude comparison circuit is responsive is in a first condition, and for comparing two binary numbers of X bits and two binary numbers of Y bits when said mode signal is in a second condition, where Z is the sum of X and Y, said circuit comprising:

Z comparison means each for comparing two binary bits, one from the corresponding bit position of each of two binary numbers under comparison by said magnitude comparison circuit, and producing an output indicative of the relative magnitudes of such bits;

a first logic network, responsive to the outputs of X of said comparison means, for generating an output indicative of the relative magnitudes of two X-bit binary numbers; and a second logic network, responsive to the outputs of Y of said comparison means when said mode signal is in said first condition for generating an output indicative of the relative magnitudes of two Y-bit binary numbers, and responsive to the outputs of Y of said comparison means and the output of said first logic network when said mode signal is in said second condition for generating an output indicative of the relative magnitudes of two Z-bit binary numbers.

2. A magnitude comparison circuit for comparing two binary numbers of Z bits when a mode signal to which said magnitude comparison circuit is responsive is in a first condition, and for comparing two binary numbers of X bits and two binary numbers of Y bits when said mode signal is in a second condition, where Z is the sum of Y and Y, said circuit comprising:

Z comparison means each for comparing two binary bits, one from the corresponding bit position of each of two binary numbers under comparison by said magnitude comparison circuit, and producing an output indicative of the relative magnitudes of such bits;

a fist logic network, responsive to the outputs of X of said comparison means for generating an output indicative of the relative magnitude of two X-bit binary numbers when said mode signal is in said first condition, and generating an output indicative of the relative magnitudes of the X low-order bits of two Z-bit binary numbers when said mode signal is in said second condition; and a second logic network responsive to the outputs of Y of said comparison means when said mode signal is in said first condition for generating an output indicative of the relative magnitudes of two Y-bit numbers, and responsive to the outputs of Y of said comparison means and the output of said first logic network when said mode signal is in said second condition for generating an output indicative of the relative magnitudes of two Z-bit binary numbers.

3. A magnitude comparison circuit for comparing first and second Z-bit binary numbers when a mode signal to which said magnitude comparison circuit is responsive is in a first condition, and for comparing first and second X-bit binary numbers and first and second Y-bit binary numbers when said mode signal is in a second condition, where Z is the sum of X and Y, said circuit comprising:

X comparison means each for comparing two binary bits, one from the corresponding bit position of said first and second X-bit binary numbers when said mode signal is in said first condition and generating one of three outputs indicative of whether said binary bit of said second X-bit binary number is less than, equal to, or greater than the corresponding bit of said first X-bit binary number, and for comparing two binary bits, one from the corresponding bit position of the X low-order bits of said first and second Z-bit binary numbers when said mode signal is in said second condition and generating one of three outputs indicative of whether the binary bit of said X low-order bits of said second Z-bit binary number is less than, equal to, or greater than the corresponding bit of said X low-order bits of said first Z-bit binary number;

a first logic network, responsive to the outputs of said X comparison means, for generating one of three outputs indicative of whether said second X-bit binary number is less than, equal to, or greater than said first X-bit binary number when said mode signal is in said first condition, and for generating one of three outputs indicative of whether the X low-order bits of said second Z-bit binary number are less than, equal to, or greater than said Z low-order bits of said first Z-bit binary number when said mode signal is in said second condition;

Y comparison means each for comparing two binary bits, one from the corresponding bit position of said first and second Y-bit binary numbers when said mode signal is in said first condition and generating one of three outputs indicative of whether the binary bit of said second Y-bit binary number is less than, equal to, or greater than the corresponding bit of said first Y-bit binary number, and for comparing two binary bits, one from the corresponding bit position of the Y high-order bits of said first and second Z-bit binary numbers when said mode signal is in said second condition and generating one of three outputs indicative of whether the binary bit of said Y highorder bits of said second Z-bit binary number is less than, equal to, or greater than the corresponding binary bit of said Y high-order bits of said second Z-bit binary number; and a second logic network, responsive to the outputs of said Y comparison means when said mode signal is in said first condition for generating one of three outputs indicative of whether said second Y-bit binary number is less than, equal to, or greater than said first Y-bit binary number, and responsive to the outputs of said Y comparison means and the output of said first logic network when said mode signal is in said second condition for generating one of three outputs indicative of whether said second Z-bit binary number is less than, equal to, or greater than said first Z-bit binary number.

* * * * *